United States Patent [19]

Rademaker

[11] 4,300,018
[45] Nov. 10, 1981

[54] ELECTRONIC RELAY ARRANGEMENT

[75] Inventor: Gerrit Rademaker, Hilversum, Netherlands

[73] Assignee: U. S. Philips Corporation, New York, N.Y.

[21] Appl. No.: 79,020

[22] Filed: Sep. 26, 1979

[30] Foreign Application Priority Data

Oct. 13, 1978 [NL] Netherlands .......... 7810300

[51] Int. Cl.³ .................. H04M 1/26; H04L 25/20
[52] U.S. Cl. ........................................... 178/70 R
[58] Field of Search ............ 178/70 R, 71 R, 73, 178/3, 70 TS, 119, 17 R; 375/3, 4; 179/84 R, 84 A; 340/365 R

[56] References Cited

U.S. PATENT DOCUMENTS

| | | | |
|---|---|---|---|
| 3,867,567 | 2/1975 | Herron et al. | 178/3 |
| 4,000,364 | 12/1976 | Silverstein | 178/70 R |
| 4,004,091 | 1/1977 | Marley et al. | 178/70 R |

FOREIGN PATENT DOCUMENTS 567350 9/1975 Switzerland .

*Primary Examiner*—Thomas A. Robinson
*Attorney, Agent, or Firm*—Thomas A. Briody; William J. Streeter; Laurence A. Wright

[57] ABSTRACT

An electronic relay arrangement that is suitable for use as a repeater in systems for single-current as well as double-current telegraphy comprising an input circuit, an output circuit and a transmission circuit interposed between the input and output circuits. The input circuit comprises a current switching device which responds when a threshold current value of the telegraph line current is exceeded and causes a current, having a predetermined constant value, to flow through the transmission circuit. The electrical isolation between the input and output circuits can be effected by, for example, a light-emitting diode in the transmission circuit and a photo-transistor.

12 Claims, 5 Drawing Figures

4,300,018

ELECTRONIC RELAY ARRANGEMENT

The invention relates to an electronic relay arrangement comprising a transmission circuit coupled between an input circuit and an output circuit for the electrical isolation of the input and output circuits from each other, the input circuit comprising a first and a second connecting terminal for the connection of a telegraph line and an electronic relay arrangement comprising a transmission circuit coupled between an input circuit and an output circuit for the electrical isolation of the input and output circuits from each other, the input circuit comprising a first and a second connecting terminal for the connection of a telegraph line, and the input circuit comprising a current switching device having a first terminal connected to the first connecting terminal, a second terminal connected to a control input of the transmission circuit, and an output terminal coupled to the second connecting terminal, and in that the current switching device responds when a predetermined threshold line current value is exceeded.

BACKGROUND OF THE INVENTION

In systems for direct current telegraphy, more particularly in the repeaters of such systems, the formerly-used mechanical telegraph relays are now replaced to an increasing extent by electronic telegraph relays which offer important advantages as regards life, space occupied and price. For use of such telegraph relays in single-current telegraphy, the electronic equivalent of a mechanical single pole relay must be provided. Double-current telegraphy on the contrary requires a double pole relay.

An electronic relay arrangement of the type described in the preceding paragraph is known from Swiss Pat. No. 567,350. This arrangement is only suitable for single-current telegraphy systems and comprises a voltage regulator circuit in series with the telegraph line and across which circuit a light-emitting diode is connected and further comprises a voltage limiter circuit connected across the telegraph lines. Below a lower line current level no current is permitted to flow through the LED while between that lower level and an upper level the current through the LED linearly relates to the line current. Above the upper level the LED-current is held at the upper level by the voltage limiter circuit. This arrangement has the drawback that the maximum current through the LED is high which result in faster aging of this component. Further, the phototransistor which is used to collect the emitted radiation of the LED calls for an operating range which is at least as wide as that of the LED.

It is an object of the invention to provide an electronic relay arrangement of the type mentioned in the opening paragraph which obviates the above-mentioned drawbacks and provides, by means of a simple circuit, a reliable electronic relay arrangement which is little sensitive to interference. According to the invention an electronic relay arrangement of the type defined in the opening paragraph is characterized in that the current switching device is in a first of exclusively two states when the line current value is below the threshold current value and in the second (responding) state of the current switching device, a control signal is applied to the second terminal for causing a current to flow through the transmission circuit with a predetermined constant value.

The electronic relay arrangement according to the invention has the advantage that the current switching device is fed via the telegraph line. A further advantage is that the predetermined constant current through the transmission circuit supplies a defined supply current for a transmitting element (for example a light-emitting diode or a transformer winding) in the transmission circuit and that the value of this current can be chosen so (low) that a long life of these elements is ensured. A still further advantage is that the current switching device responds to the absolute value of the line current so that the current switching device is polarity insensitive and, consequently, not only suitable for single-current telegraphy but also for double-current telegraphy.

It is a further object of the invention to provide a current switching device comprising a small number of components, which components need only have a low degree of precision and by means of which an accurate and reliable current detection and current switch-over can nevertheless be effected. A current switching device for use in an electronic relay arrangement according to the invention is characterized in that the current switching device comprises a first, a second and a third transistor, in that the emitter of the first transistor is connected to the emitter of the second transistor, to the base of the third transmitter and, via a first resistor, to the output terminal in that the collector of the first transistor is connected to the first terminal, to the base of the second transistor via a first diode—which is poled into the direction of the base-emitter diode of the second transistor—and via a second resistor to the base of the first transistor, in that the collector of the second transistor is connected to the second terminal and the base of the second transistor via a third resistor to the output terminal, and in that the emitter of the third transistor is connected to the output terminal and the collector of the third transistor to the base of the first transistor.

An electronic relay arrangement for double-current telegraphy is characterized according to a further embodiment of the invention in that the current switching device is included in a diode-bridge rectifier circuit. This has the advantage that the threshold value is identical for both polarities of the line current without the need for precision components.

A further embodiment of an electronic relay arrangement for single-current telegraphy according to the invention is characterized in that the transmission circuit comprises a first terminal coupled to the first connecting terminal of the line for deriving the above-mentioned current having the predetermined constant value from the current flowing in the line, and that said current flows from the first connecting terminal, through the transmission circuit and the control input to the second connecting terminal. This measure has the advantage that the current flowing in the telegraph line can be utilized for feeding the transmission circuit.

A further embodiment of an electronic relay arrangement for double-current telegraphy according to the invention is characterized in that the transmission circuit comprises a second terminal coupled to the second connecting terminal of the line for deriving the above-mentioned current having the predetermined constant value from the current flowing in the line, the polarity of which is opposite to the polarity of the current through the first input terminal and that said current flows from the second connecting terminal through the transmission circuit and the control input to the first connecting terminal. An advantage thereof is that the polarity of the line current is available in the transmission circuit and that it can therefore be transmitted. A further advantage is that the control input of the transmission network can be used in common for both polarities.

BRIEF DESCRIPTION OF THE DRAWING

Embodiments of the invention and their advantages will now be further explained with reference to the drawings. In these drawings the same reference symbols are used for the same or corresponding elements. In the drawings.

DETAILED DESCRIPTION OF THE PREFERRED EMBODIMENTS

Figure 1:
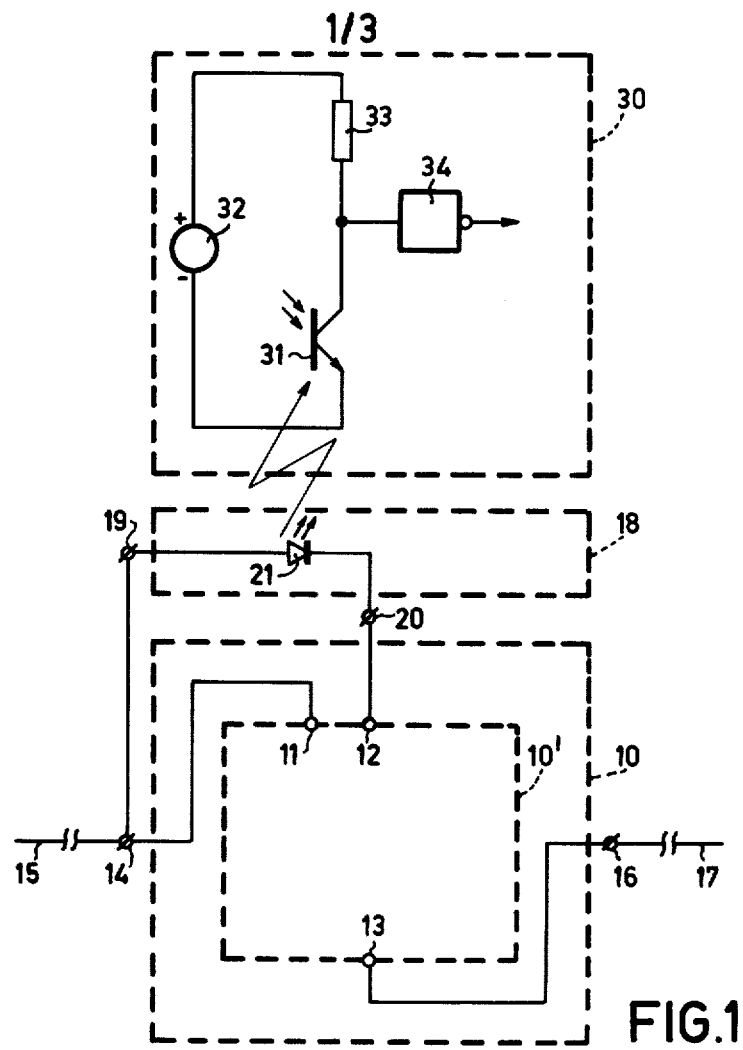
FIG. 1 shows a first embodiment of an electronic relay arrangement according to the invention.

FIG. 1 shows a first embodiment of an electronic relay arrangement according to the invention. This arrangement is suitable for use in single-current telegraphy systems. An input circuit 10 comprises a current switching device 10' having a first terminal 11, a second terminal 12 and an output terminal 13. The first terminal 11 is connected to a first connecting terminal 14 of a telegraph line 15. The output terminal 13 is connected to a second connecting terminal 16 of a telegraph line 17. A transmission circuit 18 comprises a first input terminal 19 which is connected to the first connecting terminal 14 and comprises a control input 20 connected to the second terminal 12 of the current switching device. A light-emitting semiconductor junction 21 is arranged between the input terminal 19 and the control input 20 of the transmission network 18. The direction of flow of the line current is from connecting terminal 14 to connecting terminal 16.

Figure 2:
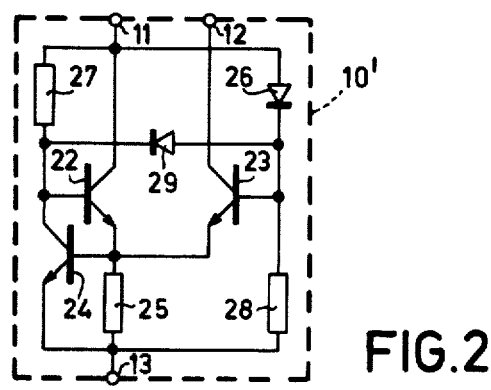
FIG. 2 shows an embodiment of a current switching device suitable for use in the relay shown in FIG. 1.

FIG. 2 shows the current switching device 10' comprising a first transistor 22, a second transistor 23 and a third transistor 24. The emitter of the first transistor 22 is connected to the emitter of the second transistor 23 and to the base of the third transistor 24. In addition, the emitter of the first transistor 22 is connected to the output terminal 13 via a first resistor 25. The collector of the first transistor 22 is connected to the first terminal 11, to the base of the second transistor 23 by way of a first diode 26 and to the base of the first transistor 22 by way of a second resistor 27. The collector of the second transistor 23 is connected to the second terminal 12 of the current switching device 10'. Furthermore, the base of the second transistor 23 is connected to the output terminal 13 via a third resistor 28. The emitter of the third transistor 24 is connected to the output terminal 13 and the collector of the third transistor 24 is connected to the base of the first transistor 22. The base of the second transistor 23 is connected to the collector of the third transistor 24 by way of a second diode 29.

The operation is as follows (FIG. 1 and FIG. 2). Assume that a line current flowing between the connecting terminals 14 and 16 increases positively from 0 mA. If the voltage between the first and the second connecting terminal 14 and 16 exceeds the base-emitter voltage of the first transistor 22 a current will flow through the first transistor 22 and through the first resistor 25. The base current of the first transistor 22 flows via the second resistor 27. The current through the main current path of the first transistor 22 can increase until the voltage across the first resistor 25 becomes higher than the base-emitter voltage of the third transistor 24. This transistor will then be rendered conductive so that the collector voltage of the third transistor 24 decreases and, consequently, the base voltage of the first transistor 22 also decreases. In response thereto the first transistor 22 will conduct less current so that the voltage across the first resistor 25 will decrease. The effect thereof is that the current through the main current path of the first transistor 22 is stabilized by the "current source and threshold device" formed by the first transistor 22, the third transistor 24 and the first resistor 25. This current value is defined as the threshold current value. This current is comparable to the current required to actuate a mechanical relay. In both cases—mechanical and electronic relay—the threshold current value is introduced to obtain a certain measure of noise suppression. An advantage is that the threshold current value can be set in a simple manner by selecting the value of the first resistor 25 accordingly. A threshold current value of 20 mA requires a 30 ohm resistor for single-current telegraphy whereas a threshold current value of 4 mA requires a 150 ohm resistor for double-current telegraphy.

At a further increase of the line current, the voltage across the connecting terminals 14 and 16 increases relatively rapidly until the second transistor 23 can take over the current through the main current path of the first transistor 22 in response to a current applied to its base via the first diode 26. The current through the main current path of the second transistor 23 is also stabilized at the threshold current value by the "current source and threshold device" which is now formed by the second transistor 23, the third transistor 24 and the first resistor 25. An advantage thereof is that a constant and defined current flows through the light-emitting diode 21, which is included in the main current path of the second transistor 23. The operating point of the light-emitting diode 21 is therefore invariable, whereas the life of this light-emitting diode 21 is advantageously influenced by the low current with which it is loaded.

A still further increase of the line current flows off through the second diode 29 and the third transistor 24. The diode 29 provides a parallel branch for current values above the threshold current value. This has the advantage that the voltage across the current switching device is limited.

Depending on the required voltage range, one or more diodes can be arranged in series with this diode 26.

It should here be noted that the current switching device 10' (FIG. 2) can also be used for other applications wherein this current must be applied to a load after detection of a predetermined current value.

The light emitted by the light-emitting diode 21 can be emitted towards a photo-sensitive element such as, for example, a photo-transistor. The output circuit 30 shown in FIG. 1 comprises a photo-transistor 31 whose emitter is connected to the negative pole of a d.c. voltage source 32 and whose collector is connected to the positive pole of the d.c. voltage source 32 via a fourth resistor 33. The collector of the photo-transistor is connected to the input of a NOR-gate 34. When the photo-transistor 31 receives the light emitted by the light-emitting diode 21 it becomes conductive and the NOR-gate is switched. The input circuit 10, which comprises the current switching device 10', is electrically isolated from the output circuit 30. The signal produced by the logic NOR-gate 34 is suitable for further digital processing.

If the threshold current value is exceeded slowly, the second transistor 23 will slowly take over the current of the first transistor 22. As a result thereof, the quantity of light emitted by the light-emitting diode 21 may be insufficient to enable activation of the logic NOR-gate 34 by the photo-transistor 31. These disturbances can occur with highly filtered telegraph character signals. By including a resistor in the connection between the emitter of the first transistor 22 and the interconnecting point of the base of the third transistor 24 and the emitter of the second transistor 23, the current switching device 10' can be given a certain degree of hysteresis. An advantage is that the first transistor 22 conducts current until the threshold current value has been reached whereafter the secoond transistor 23 rapidly takes over the current.

With single-current telegraphy the situation occurs that the threshold current value (20 mA in the above-mentioned example) is higher than wanted in view of, inter alia, the life of the transmitting element. By connecting a resistor between the first terminal 11 and the output terminal 13 in parallel with the current switching device 10' the current through the current switching device can be limited and the threshold current value be brought to a lower level.

Figure 3:
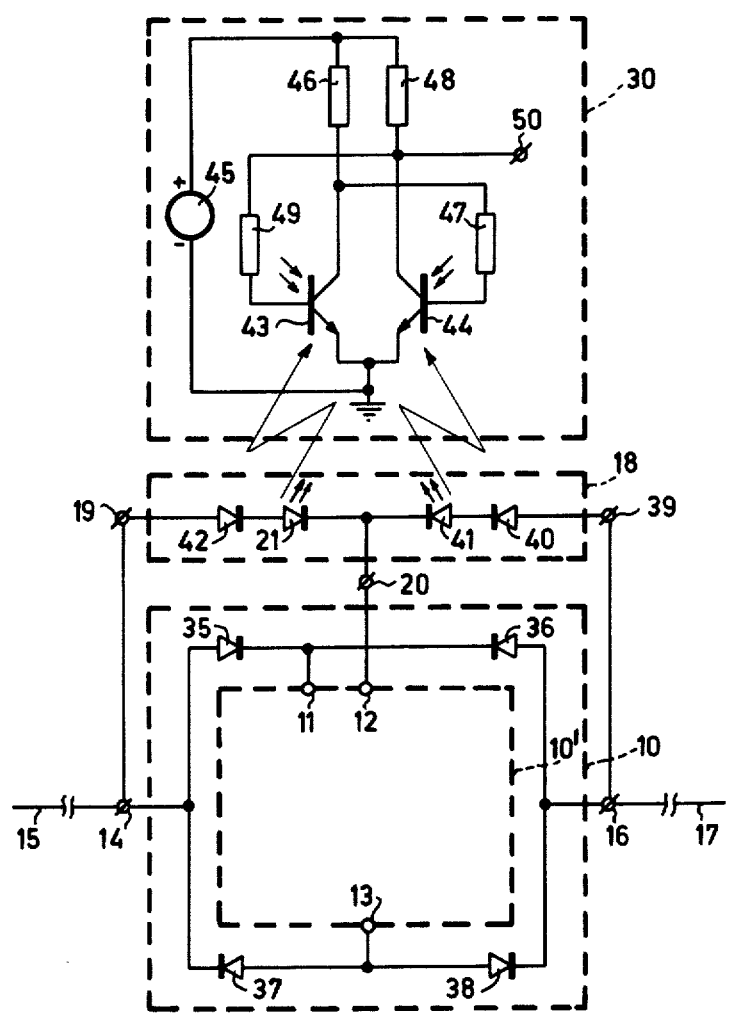
FIG. 3 shows a second embodiment of an electronic relay arrangement according to the invention.

FIG. 3 shows an embodiment of an electronic relay arrangement suitable for double-current telegraphy. The current switching device 10' is included in a diode-bridge rectifier circuit, the first terminal 11 being connected to the first connecting terminal 14 by way of a third diode 35 and to the second connecting terminal 16 by way of a fourth diode 36. The output terminal 13 is connected to the first connecting terminal 14 by way of a fifth diode 37 and to the second connecting terminal 16 by way of a sixth diode 38. An advantage thereof is that the current switching device can be utilized for both polarities of the line current and, in addition, responds, for both polarities, to exactly the same threshold current value. The transmission circuit 18 now comprises a second input terminal 39 which is connected to the control input 20 by way of a series arrangement of a seventh diode 40 and a second light-emitting diode 41. An eighth diode 42 is included between the first light-emitting diode 21 and the first input terminal 19.

The operation is as follows. If the line current flows from the first connecting terminal 14 to the second connecting terminal 16, and the line current exceeds the threshold current value, a current having the same value as this threshold current will flow through the eighth diode 42, the first light-emitting diode 21 and the control input 20 to the second terminal 12 of the current switching device 10' in response to the activation of the current switching device 10'. A first photo-transistor 43 is controlled by the light of the first light-emitting diode 21.

If the current flows from the second connecting terminal 16 to the first connecting terminal 14, and the line current exceeds the threshold current value, a current having the same value as this threshold current will flow through the seventh diode 40, the second light-emitting diode 41 and the control input 20 to the second terminal 12 of the current switching device 10' in response to the activation of the current switching device 10'. A second phototransistor 44 is controlled by the light emitted by the second light-emitting diode 41. The electronic relay arrangement shown in FIG. 3 has the advantage that the polarity of the line current is transmitted as long as the line current exceeds the threshold value. Consequently, the polarity of the telegraphy character signals can be unambiguously determined after the occurrence of interferences. This reduces the sensitivity to interferences. A further advantage is that the electronic relay arrangement shown in FIG. 3 can be used not only as a repeater but also as a line monitoring circuit, as it is not only possible to ascertain that one of the two polarities is lacking but also the lack of (sufficient) line current can be unambiguously ascertained as then neither of the light-emitting diodes 21 and 41 is activated.

The seventh diode 40 and the eighth diode 42 have for their function to protect the light-emitting diodes 21 and 41 from excessive voltages in the reverse direction.

The output circuit 30 further comprises a bistable trigger circuit of which the first photo-transistor 43 and the second photo-transistor 44 form part. The emitter of the first photo-transistor 43 is connected to the emitter of the second photo-transistor 44 and to the negative pole of a current supply 45. The collector of the first photo-transistor is connected to the positive pole of the supply 45 via a fourth resistor 46 and to the base of the second photo-transistor via a fifth resistor 47. The collector of the second photo-transistor is connected to the positive pole of the supply 45 via a sixth resistor 48 and to the base of the first photo-transistor 43 via a seventh resistor 49 and is further connected to the output 50. The bistable trigger circuit is switched over by making either photo transistor 43 or photo transistor 44 conductive. A bivalent signal is therefore available at the output 50. However, this can also be realised by means of any other photosensitive bistable trigger circuit suitable for this purpose.

Figure 4:
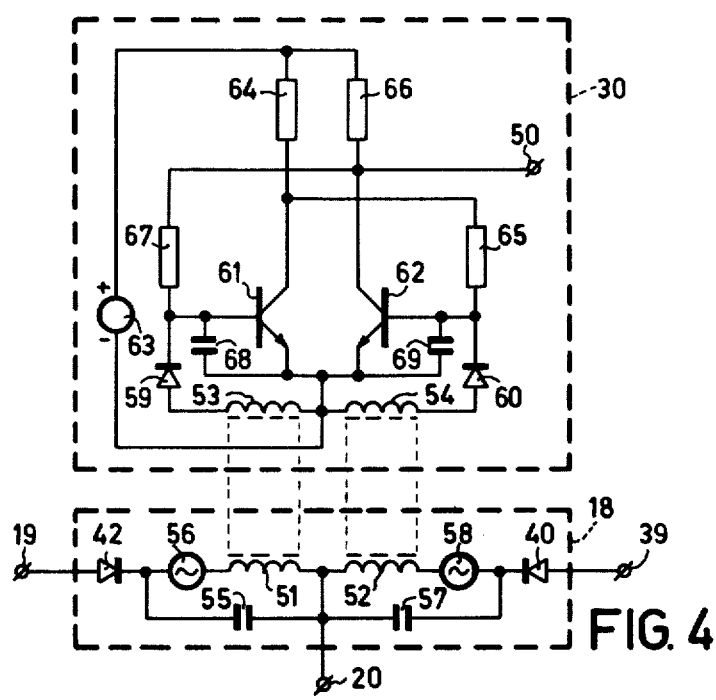
FIG. 4 shows an alternative embodiment of a transmission circuit and an output circuit for use in the electronic relay arrangement shown in FIG. 3.

FIG. 4 shows a further embodiment of a transmission circuit 18 and an output circuit 30 for use in an electronic relay arrangement shown in FIG. 3. In this embodiment the transmitting elements are two transformers, one end of the primary winding 51 of a first transformer and one end of the primary winding 52 of the second transformer being connected to the control input 20. The secondary winding 53 of the first transformer and the secondary winding 54 of the second transformer are arranged in series and coupled to a bistable trigger circuit which forms part of the output circuit 30. The first input terminal 19 of the transmission circuit 18 is connected to the control input 20 via a series arrangement of the diode 42 and a first resonant circuit. The first resonant circuit comprises a parallel arrangement of a first capacitor 55 and a series arrangement of a first a.c. voltage source 56 and the primary winding 51. The second connecting terminal 39 is connected to the control input 20 via a series arrangement of the diode 40 and a second resonant circuit. The second resonant circuit comprises a parallel arrangement of a second capacitor 57 and the series arrangement of a second a.c. voltage source 58 and the primary winding 52. The first and the second resonant circuit, respectively, are either energized or damped, depending on whether the line current flows through the first or the second input terminal (19 or 39), which results in a voltage being induced in the secondary winding. The resonant circuits effect a direct current-to-alternating current conversion. The a.c. voltages induced in the secondary windings 53 and 54 are rectified, depending on the polarity, by a ninth diode 59 and a tenth diode 60. The cathode of diode 59 is connected to the base of a fourth transistor 61 and the cathode of diode 60 is connected to the base of a fifth transistor 62. The transistors 61 and 62 form part of a bistable trigger circuit. The emitter of the fourth transistor 61 is connected to the emitter of the fifth transistor 62 and to a common connecting point of the secondary windings 53 and 54. This point is further connected to the negative pole of a supply source 63. The collector of the fourth transistor 61 is connected to the positive pole of the voltage source 63 via an eighth resistor 64 and to the base of the fifth transistor 62 via a ninth resistor 65. The collector of the fifth transistor 62 is connected to the positive pole of the supply source via a tenth resistor 66 and to the base of the fourth transistor 61 via an eleventh resistor 67. The base and the emitter of the fourth transistor 61 are interconnected via a third capacitor 68 and the base and the emitter of the fifth transistor 62 are interconnected via a fourth capacitor 69. The output circuit 30 operates as follows. Assume, that at a given instant, transistor 61 is conducting and transistor 62 is cut off. If the base voltage of transistor 62 is increased current will start flowing through transistor 62 in response to which the collector voltage of this transistor decreases. Via the resistor 67 this decrease is transferred to the base of the transistor 61, causing the current through transistor 61 to decrease. This will result in a further increase of the current through transistor 62, as the sum of the emitter currents is constant. The ultimate result is that transistor 61 is cut off and transistor 62 is conductive. The further voltage pulses resulting from the rectification of the induced a.c. voltage across the secondary windings 53 and 54 do not affect the state of the bistable trigger circuit if they have the same polarity as the voltage pulse with which the bistable trigger circuit is switched over to the last-described state.

Figure 5:
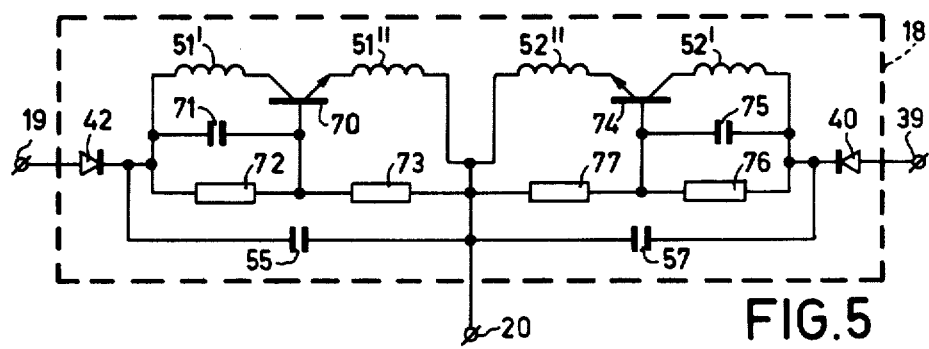
FIG. 5 shows a second alternative embodiment of a transmission circuit for use in the electronic relay arrangement shown in FIG. 4.

FIG. 5 shows an embodiment of an alternative transmission circuit 18 for use in the electronic relay arrangement shown in FIG. 4. A first active LC-resonant circuit is arranged between the seventh diode 42 and the control input 20 and a second active LC-resonant circuit is arranged between the eighth diode 40 and the control input 20. The primary winding 51 of the first transformer is divided into two portions 51' and 51" in the first active LS-resonant circuit. The collector of a transistor 70 is connected to the cathode of diode 42 via the first portion 51'. The base of transistor 70 is also connected to the cathode of diode 42 via a parallel arrangement of a capacitor 70 and a resistor 72. The emitter of transistor 71 is connected to the control input 20 via the second portion 51". The control input is connected to the base of transistor 70 via a resistor 73 and to the cathode of diode 42 via the capacitor 55.

The primary winding 52 of the second transformer in the second active LS-resonant circuit is divided into two portions: 52' and 52". The cathode of the diode 40 is connected to the collector of a transistor 74 via the first portion 52', connected to the base of transistor 74 via a parallel arrangement of a capacitor 75 and a resistor 76 and to the control input 20 via the capacitor 57. The emitter of transistor 74 is connected to the control input 20 via the second portion 52". The base of transistor 74 is connected to the control input 20 via a resistor 77.

The transmission circuit 18 shown in FIG. 5 has the same function as described for the transmission circuit shown in FIG. 4. An advantage of the resonant circuit shown in FIG. 4 and FIG. 5 is that the oscillator is damped at a value of the current somewhat below the threshold current value. This implies that the repeater shown in FIG. 4 and FIG. 5 is suitable to effect a line monitoring which responds to approximately the same threshold value as the current switching device.

What is claimed is:

1. An electronic relay arrangement comprising a transmission circuit coupled between an input circuit and an output circuit for the electrical isolation of the input and output circuits from each other, said input circuit comprising a first and a second connecting terminal for the connection of a telegraph line, and said input circuit also comprising a current switching device having a first terminal connected to said first connecting terminal, a second terminal connected to a control input of said transmission circuit, and an output terminal coupled to said second connecting terminal, and said current switching device responding when a predetermined threshold line current value is exceeded so that said current switching device is in a first of exclusively two states when the line current value is below the threshold current value and in the second state of said current switching device, a control signal is applied to said second terminal for causing a current to flow through said transmission circuit with a predetermined constant value.

2. An electronic relay arrangement as claimed in claim 1, wherein said transmission circuit comprises a first input terminal which is coupled to the first connecting terminal of the line for deriving said current, having the predetermined constant value, from the current flowing in the line and that said current flows from the first connecting terminal through the transmission circuit and the control input to the second connecting terminal.

3. An electronic relay arrangement as claimed in claim 2, wherein the value of the predetermined constant current is equal to the threshold current value.

4. An electronic relay arrangement as claimed in claim 2 or 3, wherein said current switching device comprises a first, a second and a third transistor, the emitter of the first transistor being connected to the emitter of the second transistor, to the base of the third transistor and to the output terminal via a first resistor, the collector of the first transistor being connected to the first terminal, to the base of the second transistor by way of a first diode which is poled in the direction of the base-emitter diode of the second transistor and to the base of the first transistor via a second resistor, said collector of the second transistor being connected to the second terminal and the base of the second transistor being connected to the output terminal via a third resistor, and said emitter of the third transistor being connected to the output terminal and the collector of the third transistor being connected to the base of the first transistor.

5. An electronic relay arrangement as claimed in claim 4, wherein the base of the second transistor is connected via a second diode, in the opposite direction of the collector-base diode of the third transistor, to the collector of the third transistor for causing the portion of the line current exceeding the threshold current to flow from the first terminal to the output terminal in the second state of the current switching device.

6. An electronic relay arrangement as claimed in claim 1, characterized in that the current switching device is included in a diode bridge rectifier circuit.

7. An electronic relay arrangement as claimed in claim 6 wherein said transmission circuit comprises a second input terminal which is coupled to the second connecting terminal for deriving said current having the predetermined constant value from the current flowing in the line, the polarity of this current being opposite to the polarity of the current through the first input terminal, said current flowing from the second connecting terminal through the transmission circuit and the control input to the first connecting terminal.

8. An electronic relay arrangement as claimed in claim 6 or 7, wherein said diode bridge rectifier circuit comprises a third, a fourth, a fifth and a sixth diode and the first terminal is connected to the first connecting terminal via the third diode and to the second connecting terminal of the line via the fourth diode and the output terminal of the current switching device is connected to the first connecting terminal via the fifth diode and to the second connecting terminal via the sixth diode.

9. An electronic relay arrangement as claimed in claim 7 wherein said transmission circuit comprises at least one radiation emitting element, coupled to the input circuit, and at least one radiation-sensitive element in the output circuit.

10. An electronic relay arrangement as claimed in claim 8 wherein said transmission circuit comprises a first transformer having a primary winding coupled to the input circuit and a secondary winding coupled to the output circuit, said transmission circuit also comprising a second transformer comprising a primary winding coupled to the input circuit and a secondary winding coupled to the output circuit and the primary winding of the first transformer forming part of a first LC-resonant circuit and the primary winding of the second transformer forming part of a second LC-resonant circuit.

11. A current switching device, for use in an electronic relay arrangement as claimed in claim 1, wherein said current switching device comprises a first, a second and a third transistor, said emitter of the first transistor being connected to the emitter of the second transistor, to the base of the third transistor and, via a first resistor, to an output terminal of the device and the collector of the first transistor being connected to an input terminal, to the base of the second transistor via a first diode, poled in the direction of the base-emitter diode of the second transistor, and to the base of the first transistor via a second resistor, the collector of the second transistor being connected to a control terminal, and the base of the second transistor being connected to the output terminal via a third resistor, and the emitter of the third transistor being connected to the output terminal, and the collector of the third transistor being connected to the base of the first transistor.

12. A current switching device as claimed in claim 11, wherein said base of the second transistor is connected via a second diode, poled in the opposite direction of the collector-base diode of the third transistor, to the collector of the third transistor for causing the portion of the line current exceeding the threshold current to flow from the input terminal to the output terminal in the second state of the current switching device.

* * * * *